United States Patent [19]
Aoshima et al.

[11] Patent Number: 5,774,718
[45] Date of Patent: Jun. 30, 1998

[54] PROCESS SCHEDULING SYSTEM THAT ALLOCATES CPU TIME WITH PRIORITY TO INTERACTIVE TYPE PROCESSES

[75] Inventors: Naoto Aoshima; Haruo Kimura; Katsuhito Minai, all of Kawasaki, Japan

[73] Assignee: Fujitsu Limited, Kawasaki, Japan

[21] Appl. No.: 519,087

[22] Filed: Aug. 24, 1995

[30]    Foreign Application Priority Data

Aug. 26, 1994  [JP]  Japan .................................... 6-202421

[51] Int. Cl.[6] .................................................. G06F 9/00
[52] U.S. Cl. ........................ 395/670; 395/674; 395/672
[58] Field of Search .................... 395/670, 673, 395/672, 677, 674, 704; 364/200, 228.2, 230, 230.2, 230.3

[56]              References Cited

U.S. PATENT DOCUMENTS

| | | | |
|---|---|---|---|
| 4,126,895 | 11/1978 | Weemaes et al. | 364/200 |
| 4,495,562 | 1/1985 | Yamaji et al. | 364/200 |
| 4,912,628 | 3/1990 | Briggs | 364/200 |
| 5,047,919 | 9/1991 | Sterling et al. | 364/200 |
| 5,210,872 | 5/1993 | Ferguson et al. | 395/650 |
| 5,371,689 | 12/1994 | Tatsuma | 364/569 |
| 5,636,376 | 6/1997 | Chang | 395/704 |

*Primary Examiner*—Alvin E. Oberley
*Assistant Examiner*—Majid A. Banankhah
*Attorney, Agent, or Firm*—Staas & Halsey

[57]                ABSTRACT

A process action status monitoring section monitors the cumulative CPU time and the idle time for a plurality of processes being executed on a time-sharing basis; those results are recorded in a process action status table. A process type determination section, based on the said cumulative CPU times, classifies those processes for which the cumulative CPU time is equal to or less than a certain threshold value as interactive type process, and classifies processes for which the cumulative CPU time exceeds the threshold value as non-interactive type processes. A non-interactive type process priority control section controls the priorities of processes judged to be non-interactive type processes by the process type judgement section. An interactive type process priority control section controls the priority of processes judged to be interactive type processes. A process selection section selects the process having the highest priority from among the interactive type processes or the non-interactive type processes. A CPU allocation section allocates the CPU to the process selected by the process selection section.

14 Claims, 23 Drawing Sheets

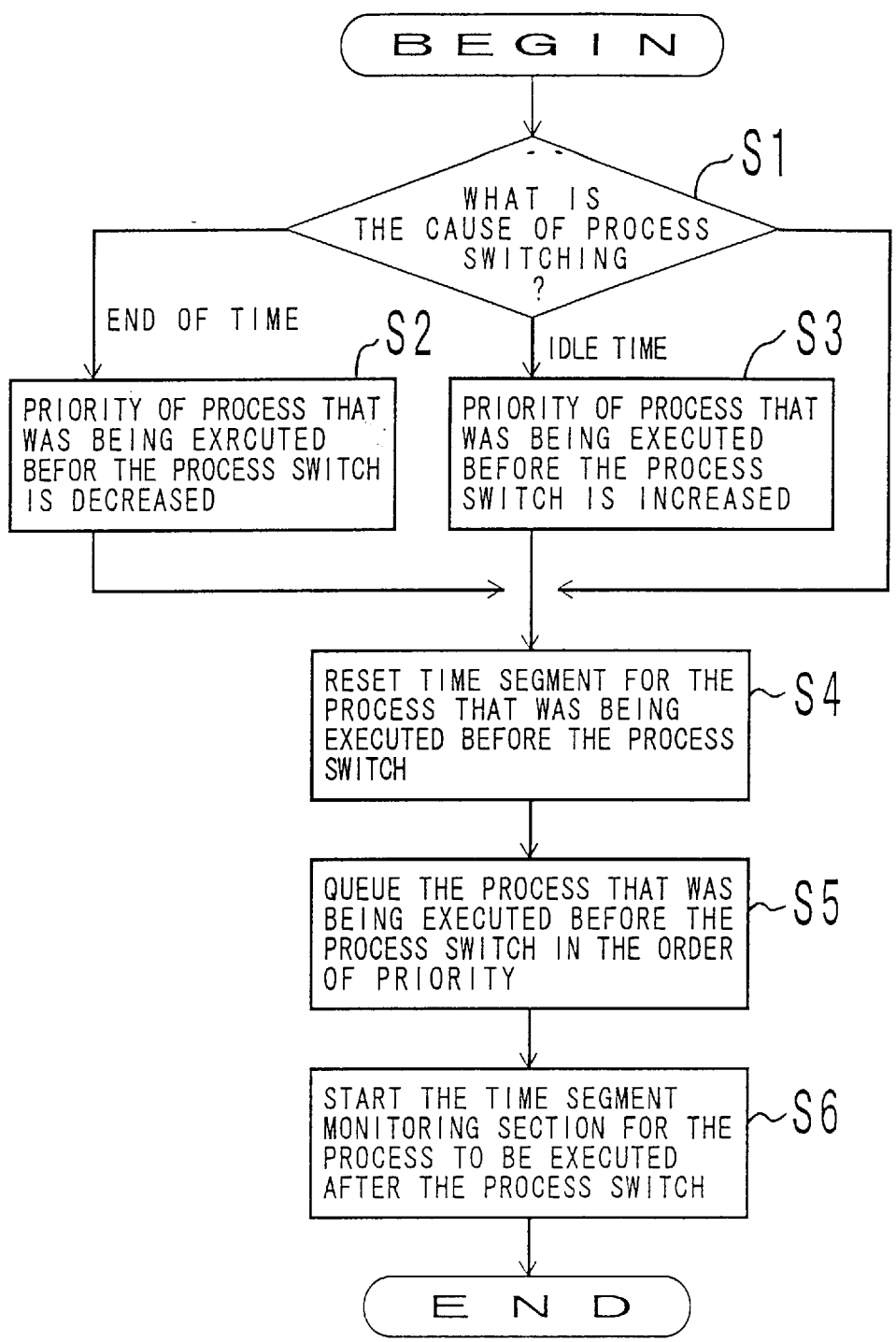
F I G. 3

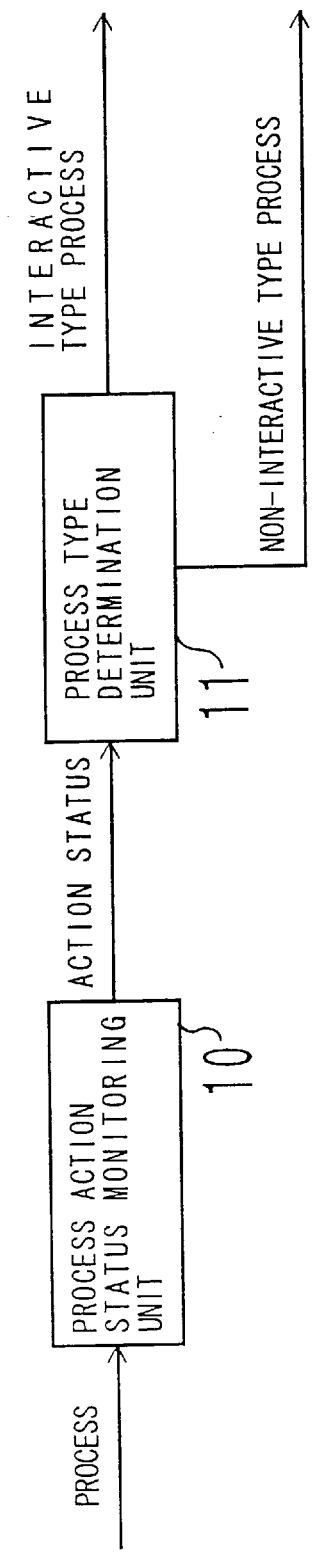
F I G. 4

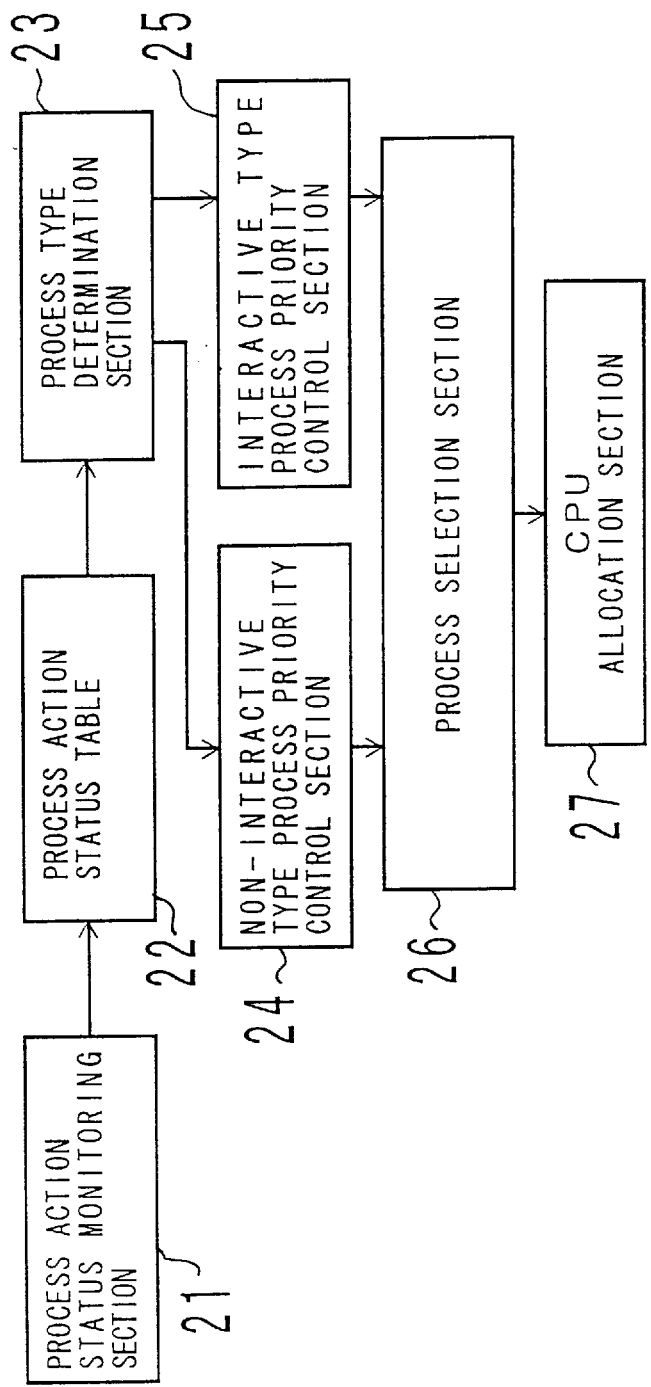
F I G. 7

PROCESS ACTION STATUS TABLE 22

| | PROCESS 1 | PROCESS 2 | ..... | PROCESS n |
|---|---|---|---|---|
| CUMULATIVE CPU TIME | 100 msec | 30 msec | ..... | 210 msec |
| IDLING START TIME | TIME 1 | TIME 2 | ..... | TIME n |

CUMULATIVE CPU TIME STRAGE LOCATION AREA 31

IDLING START TIME STRAGE LOCATION AREA 32

Fig. 9

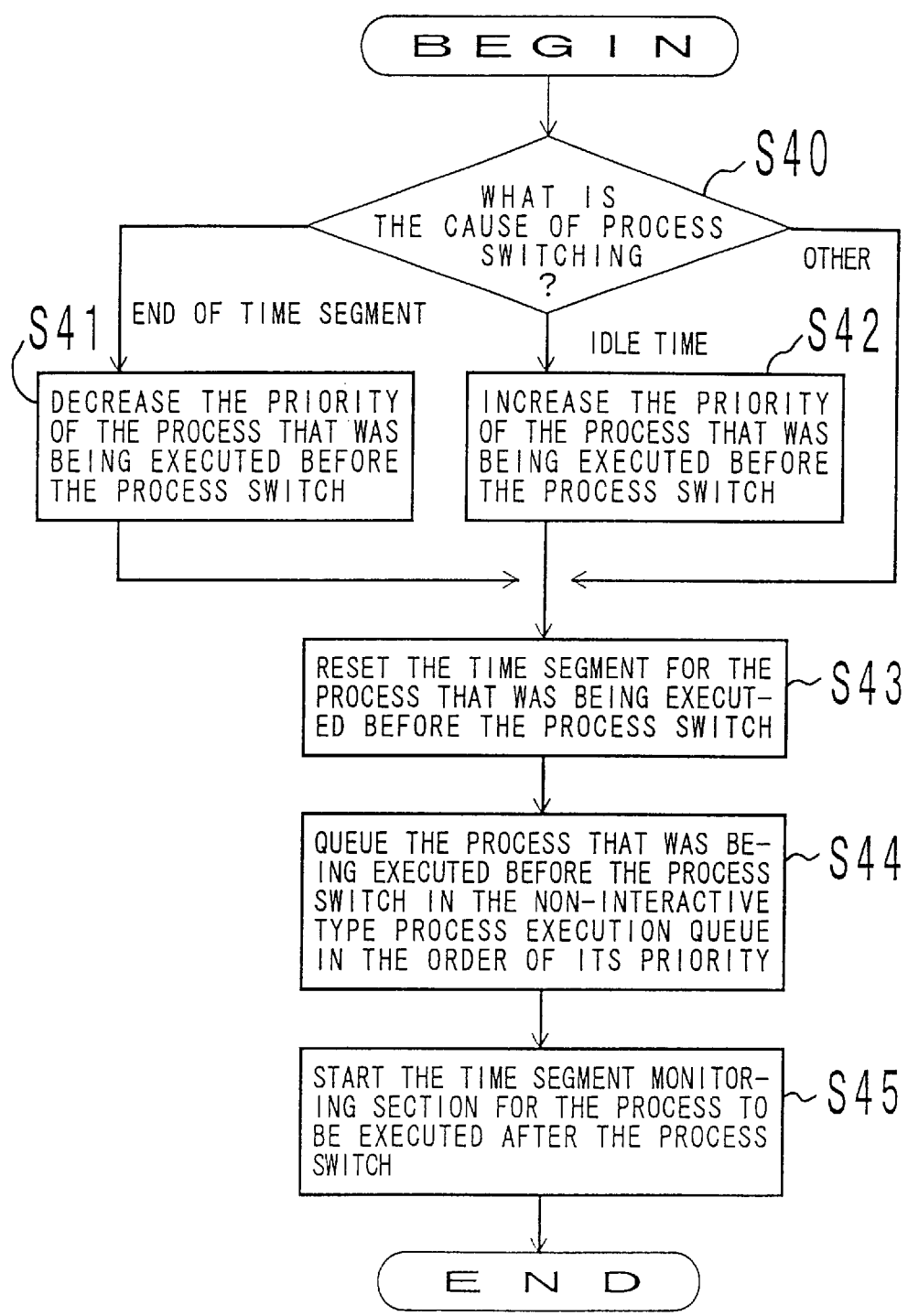
F I G. 16

PROCESS SCHEDULING SYSTEM THAT ALLOCATES CPU TIME WITH PRIORITY TO INTERACTIVE TYPE PROCESSES

BACKGROUND OF THE INVENTION

1. Field of the invention

The present invention relates to a computer system that has a function that allocates CPU time to a plurality of processes or jobs. More specifically, it relates to the process scheduling system in the electronic computer system, which can allocate CPU time with priority to interactive type processes.

2. Description of the Related Art

In a computer system which performs parallel processing involving the division of CPU time and its allocation to several different types of processes, such as interactive type processes and batch processes, it is necessary to use the CPU as efficiently as possible.

In particular, in interactive type processes, in which, for example, processing is performed in response to input from operators' keyboards, it is necessary to schedule the group of processes so that the response will be as fast as possible.

FIG. 1 is a block diagram that explains an existing-process priority control system. In this figure, the process priority control section 1 controls the priority of processes in the manner to be described below. The process selection section 2 selects processes in accordance with the results of that priority control. The CPU allocation section 3 allocates, for example, a fixed amount of CPU time called a time segment to the process selected at the time of process switching, and executes the processes.

FIG. 2 is a block diagram showing a detailed configuration of the process priority control section 1 in FIG. 1. As shown in this figure, the process priority control section 1 consists of a priority determination section 4 that starts operating at the time of process switching, and determines the priority in accordance with the flow chart to be described below; a time segment monitoring section 5 that acts in parallel with the process execution to monitor the short periods of CPU time called time segments corresponding to each process; and an execution queue 6 in which the processes are queued in their order of priority.

FIG. 3 is a flow chart of the process scheduling processing that is executed by the priority determination section 4. In this figure, when the processing starts, first the cause of process switching is judged in step S1.

When the cause is that a time segment has ended, the priority of the process that was executed before the switching is decreased in step S2. When the cause of the switching is in idle time, the priority of the process that was executed before the switching is increased in step S3.

When the process switching is due to some other cause, the priority of the process that was executed before the switching is not changed, and the processing proceeds to step S4.

In step S4, the time segment is reset for the process that was being executed before the switching. In step S5 the process that was being executed before the switching is queued in the execution queue 6 in FIG. 2 according to its priority. In step S6, the time segment monitoring section 5 starts monitoring the process that is executed after the switching and ends the processing. As the execution proceeds, the time segment monitoring section 5 decreases the time segment; when the time segment reaches 0 the execution of that process is halted and the process is switched.

Until now the process priority has been controlled in accordance with whether the cause of the switching is the end of the time segment or is in idle time, as shown in FIG. 3.

However, it has not allocated the CPU time preferentially for a interactive process.

For this reason, if, for example, there is a process that requires the system to respond to an operator's input from a keyboard and then immediately go into a waiting state for an input, if the load on the system becomes large and the CPU time allocated to each process becomes inadequate, the CPU time allocated to the interactive process will decrease, causing the problem that the response to input will become poor.

This deterioration of response can cause trouble for the user when executing a program that requires frequent input and output, such as a word processor or editor.

SUMMARY OF THE INVENTION

This invention has the objective of providing a process scheduling system that suppresses the deterioration of the response in a interactive type process.

The process scheduling system of this invention is used in a computer system that processes a plurality of processes on a time sharing system. A process action status monitoring unit monitors the respective action statuses of a plurality of processes. A process type determination unit classifies the respective processes into interactive type, and non-interactive type based on the results of monitoring by the process action status monitoring unit. The CPU in the computer system is allocated preferentially to processes that are classified as interactive type by the process determination unit.

In this invention, the cumulative CPU time used by each of the respective processes is monitored by the process action status monitoring unit. Then, at the time of process switching, the process type is judged before the process is queued in the execution queue.

The process type is judged according to whether or not the cumulative CPU type used exceeds a certain threshold value. That is to say, if the cumulative CPU time used exceeds the threshold value, that process is classified as being of the non-interactive type; if the time does not exceed the threshold, the process is classified as interactive type.

An interactive type process often includes long periods of idle time, for example, because the input interval-between ordinary operator key-board inputs is long. The process action status monitoring unit monitors the time during which the respective processes are sleeping, that is to say, the idle time. If that idle time exceeds a certain threshold value, the cumulative CPU time used is cleared to 0.

In other words, in general a process that frequently has long periods of idle time and has relatively little cumulative CPU time used between the periods of sleep is classified as the interactive type. By assigning a higher priority number to interactive type processes than to this non-interactive type process, CPU time is allocated to interactive type processes with priority over non-interactive type processes.

BRIEF DESCRIPTION OF THE DRAWINGS

FIG. 3 designates a processing flow chart for the priority determination section in FIG. 2;

FIG. 4 hows a block diagram of the configuration of the principle of the present invention;

FIG. 7 shows a block diagram of the configuration of an embodiment of process scheduling of the present invention;

FIG. 9 shows a diagram of an example of storage of a process a on status table of the present invention;

FIG. 16 designates a processing flow chart of the priority determination section for a non-interactive type process of the present invention;

DESCRIPTION OF THE PREFERRED EMBODIMENTS

First, the principle of the present invention will be explained, with reference to the drawings.

FIG. 4 is a block diagram explaining the principle of the present invention. This figure is a block diagram showing the configuration of the principle of a process scheduling system in a computer system that processes a plurality of processes on a time sharing basis.

In FIG. 4, the process action status monitoring unit 10 monitors the respective action statuses of a plurality of processes. The process type determination unit 11 classifies the respective processes as interactive type or non-interactive type based on the results of monitoring by the process action status monitoring unit 10. The computer system CPU is allocated preferentially to processes classified as interactive type by the process type determination unit 11.

In this invention, the cumulative CPU time used by the respective processes is monitored by, for example, the process action status monitoring unit 10. Then at, for example, the time of process switching, the process type is determined before the process is queued in the execution queue.

The criterion for determining whether a process is of the interactive type or the non-interactive type is whether or not this cumulative CPU time exceeds a certain threshold value. If it is exceeded, that process is classified as the non-interactive type; if it is not exceeded, that process is classified as the interactive type.

It often happens that a interactive type process goes into long periods of idle time, for example, because the input interval between operator keyboard inputs is long.

The times during which the respective processes are idling, that is to say the idle times, are monitored by the process action status monitoring unit 10. If this idle time exceeds a certain threshold value, the cumulative CPU time is cleared to 0.

For this reason, in general a process that frequently idle time for a long time and has a relatively small amount of cumulative CPU time used between idle time, is classified as being of the interactive type; by, for example, having the process priority control unit assign larger priority numbers to this interactive type processes than to non-interactive type process, CPU time is allocated to interactive type processes with higher priority than to non-interactive type processes.

Next, an embodiment of this invention will be explained in detail, with reference to the drawings.

Figure 5:
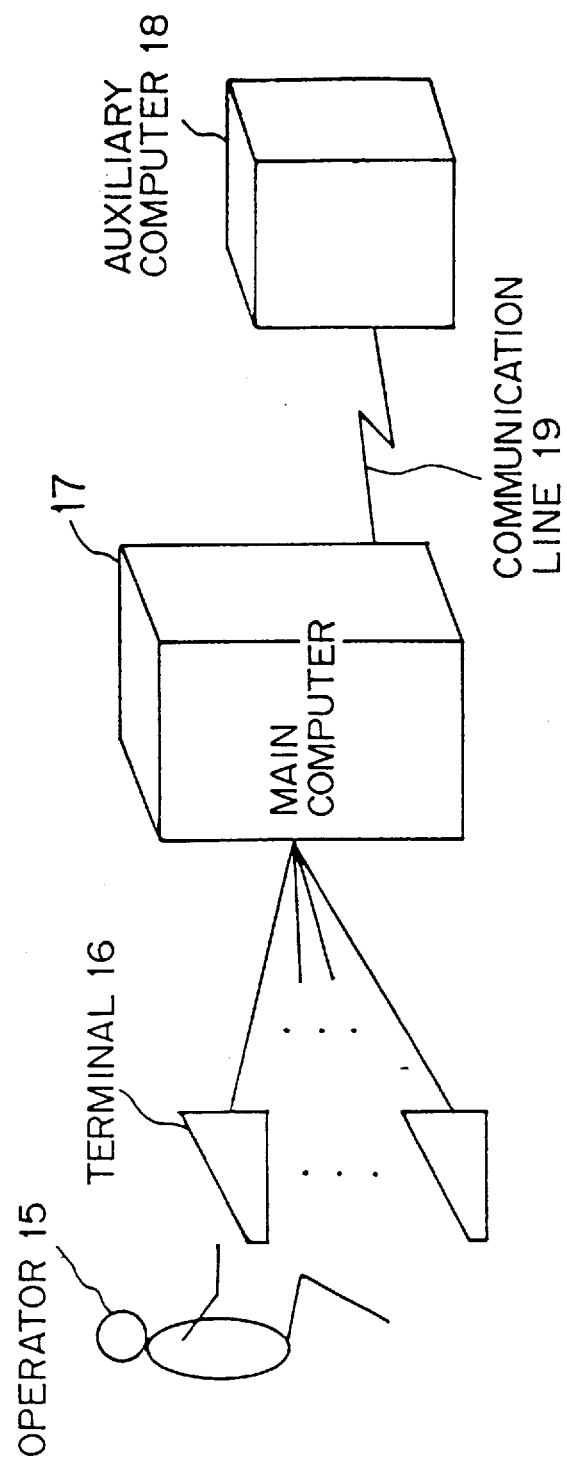
FIG. 5 shows a diagram of the overall configuration of a computer system using the process scheduling system of the present invention.

FIG. 5 is a block diagram showing the overall configuration of a computer system using the process scheduling system of the present invention. In this diagram, the operator 15 can execute a interactive process or a non-interactive process in the main computer 17 using the terminal 16. In addition, the communication line 19 can be used to execute a non-interactive process in the main computer 17 from an auxiliary computer 18.

The main computer 17 and the auxiliary computer 18 each consists of a CPU, a memory, a disc unit, a timer, etc. A process is a unit of processing when the CPU executes a plurality of programs.

Figure 6:
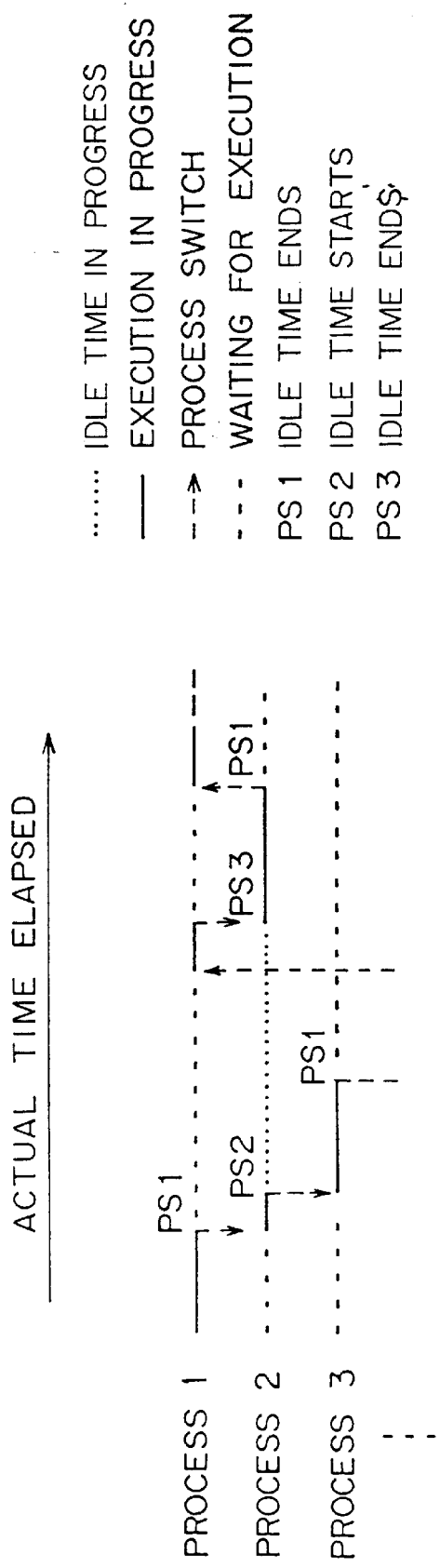
FIG. 6 represents a diagram explaining an embodiment process scheduling of the present invention.

FIG. 6 is a diagram explaining an embodiment of process scheduling. The main axis or horizontal "x" axis shows elapsed time; the figure shows the switching from one process to another with time. In this figure, process 2 goes through a period of idle time; the other processes do not. PS1 is a process switch at the end of a time segment; PS2 is a process switch that occurs when a process being executed goes into idle time;

PS3 is a process switch that occurs at the end of the idle time.

In general, in an interactive type process it often happens that there are many relatively long periods of idle time. That is to say, in a typical interactive process such as an editor, the system waits for input from the operator during relatively long periods of idle time, and when there is input performs relatively short processing in response to it. In contrast, in a typical non-interactive process such as a compiler, there are only relatively short periods of idle time, for example during access to a disc unit.

FIG. 7 is a block diagram showing the configuration of a process scheduling system which is an embodiment of this invention. In this figure, a process action status monitoring section 21 monitors the CPU time used and the idle time for a plurality of processes that are being executed on a time sharing basis, and records the results in the process action status table 22. The process type judgement section 23 classifies processes for which the cumulative CPU time recorded in the process action status table 22 is at or below a certain threshold value, as being of the interactive type, while processes for which the CPU time exceeds the threshold value are classified as being of the non-interactive type. The times for these processes are obtained from a timer which is not shown in the figure. The "sections" are programs which are executed by the CPU; the table is arranged in the memory.

The non-interactive type process priority control section 24 controls the priority of processes judged to be of non-interactive type by the process type judgement section 23. The interactive type process priority control section 25 controls the priority of processes determined to be of interactive type.

The process selection section 26 selects the highest priority process from among, for example, the interactive type processes or the non-interactive type processes. The CPU allocation section 27 allocates CPU time to the process selected by the process selection section 26 at the time of process switching, and commands the execution of that process. The actual execution of the process is done by the CPU in accordance with the instructions of a program on memory.

Figure 8:
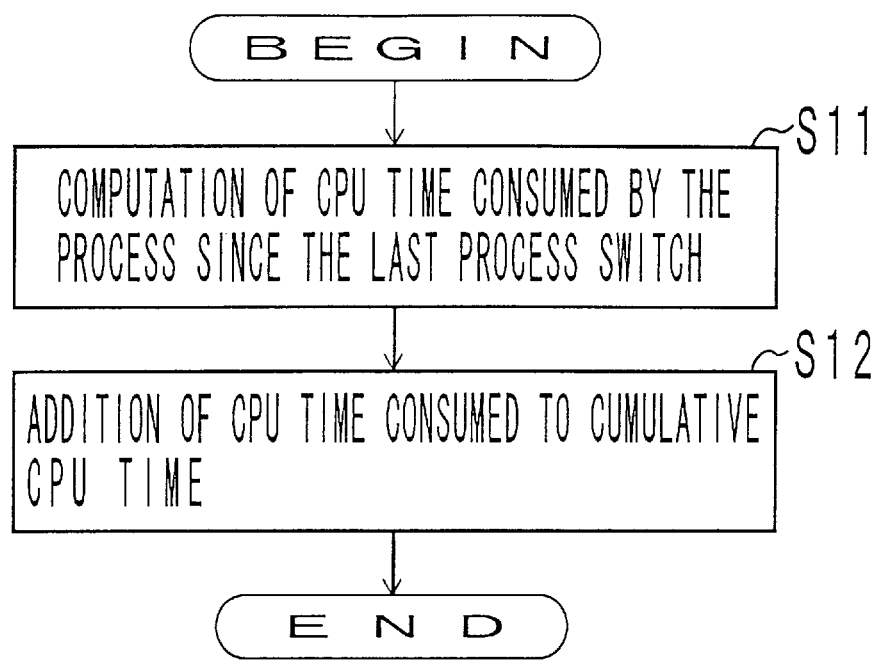
FIG. 8 designates a processing flow chart (of the processing at the time of process switching) of the process act status monitoring section of the present invention.

Next, the action of each of the elements shown in FIG. 7 will be explained in more detail. First, the process action status monitoring section 21 starts operating whenever a process is switched, process idle time starts or process idle time ends. FIG. 8 is a flow chart of the processing in the process action status monitoring section 21 at the time of process switching. In this figure, when processing starts, first, in step S11, the CPU time consumed by the process that has been executed since the last process switch is computed. In step S12 the computed CPU time is added to the cumulative CPU time used in the process action status table 22.

FIG. 9 shows an example of a process action status table. In this figure, there are a cumulative CPU time storage location area 31 and a idling start time storage location area 32, for each process that is being executed on a time-sharing basis. In the processing executed in step S12 in FIG. 8, the CPU time used by the process that was being executed up until the process switching time is added to the stored value of the cumulative CPU time used by that process, and the new value including the addition is stored in that area in place of the old value.

Figure 10:
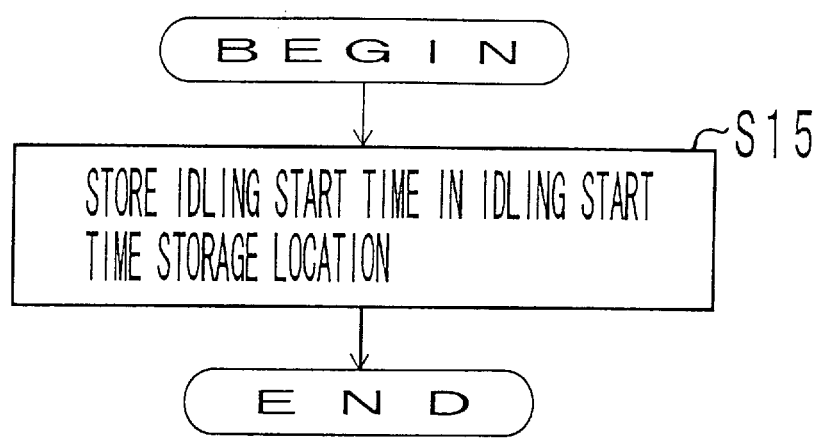
FIG. 10 designates a processing flow chart (of processing at the start of idle time) of the process action status monitoring section of the present invention.

FIG. 10 is a flow chart of the processing in the process action status monitoring section 21 at the time of the start of idling of the process being executed. In this figure, when the process being executed starts idle time, in step S15 the time of the start of idling is stored in the location for that process in the idling start time storage area 32, and the processing ends.

Figure 11:
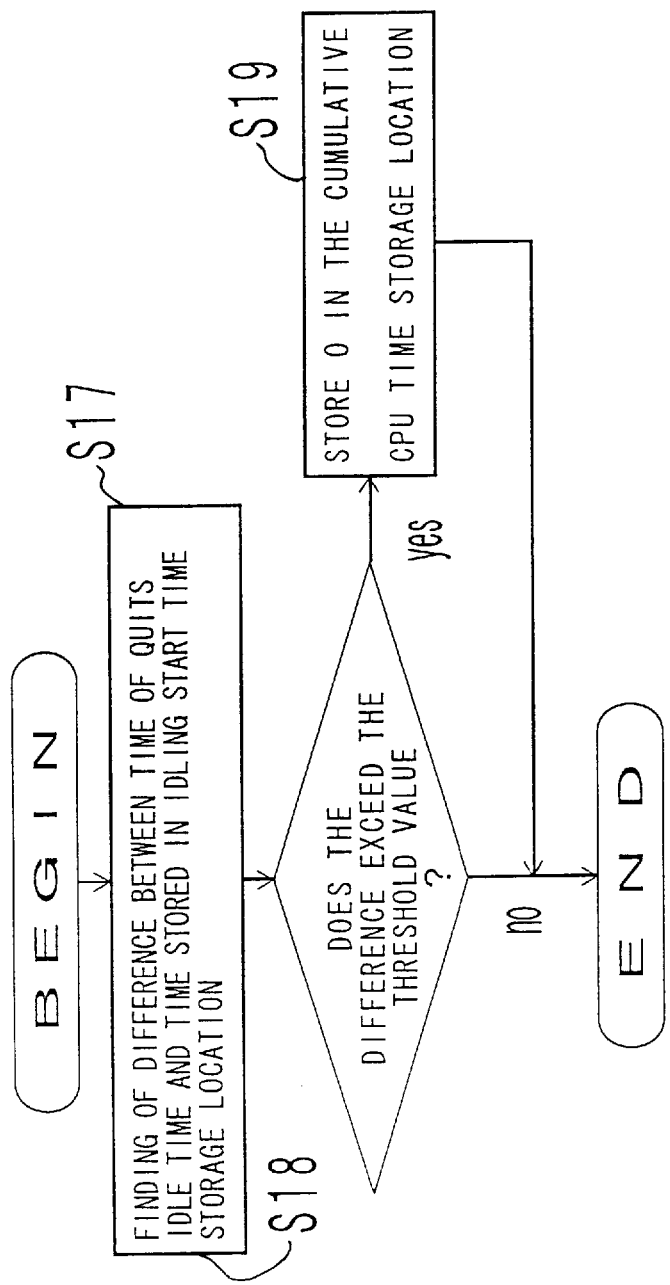
FIG. 11 designates a processing flow chart (of processing at the end of idle time) of the process action status monitoring section of the present invention.

FIG. 11 is a flow chart of the processing in the process action status monitoring section 21 at the time that a process quits idle time. In this figure, when processing starts, first in step S17, the difference between the time when that process quitted idle time, and the idling start time stored in the idling start time storage area 32, is found. In step S18 it is judged whether or not that difference exceeds the threshold value.. If it does exceed the threshold, then the value stored for that process in the cumulative CPU time storage area 31 in FIG. 9 is cleared to 0, and the processing ends. If, in step S18, the cumulative CPU time does not exceed the threshold value, then the processing ends without the value being cleared.

Figure 12:
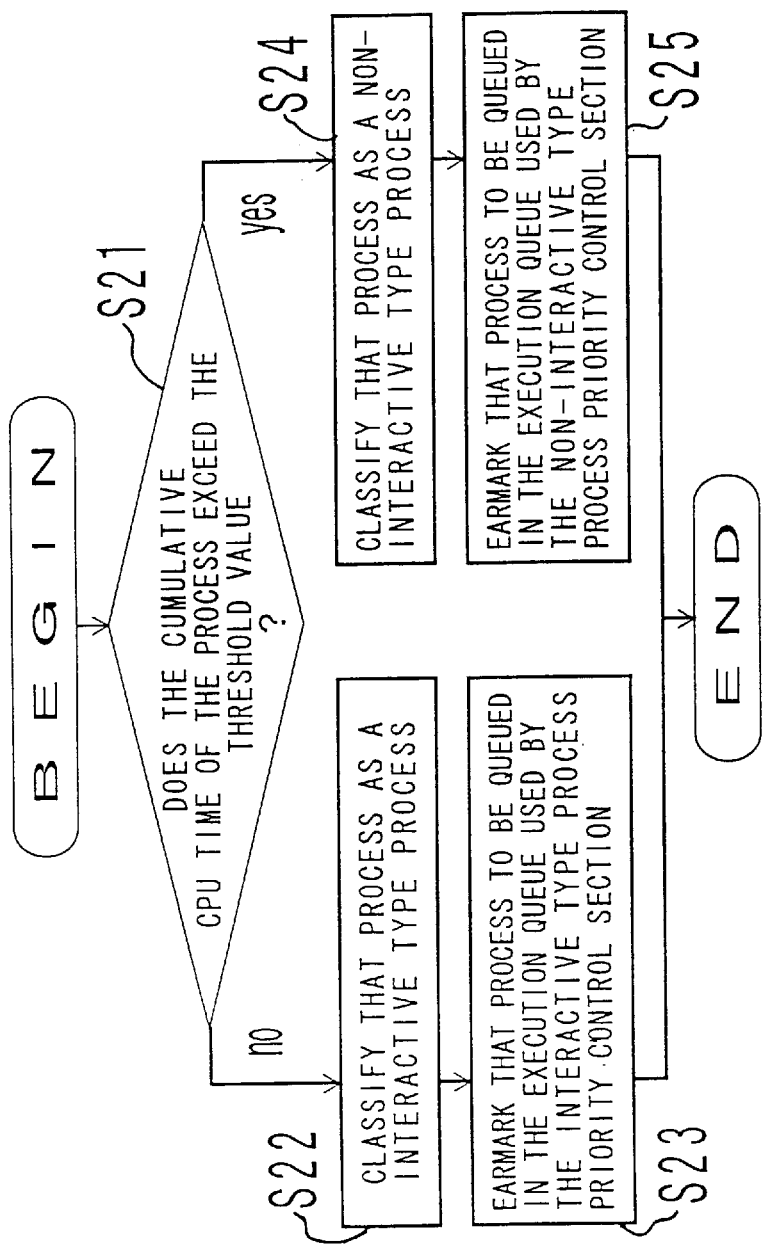
FIG. 12 designates a processing flow chart of the process type judgement section of the present invention.

FIG. 12 is a flow chart of the processing in the process type judgement section 23 in FIG. 7. The process type judgement section 23 starts operation when, for example, a process switch occurs and the process that has been executed up until the time of the process switch is queued in the execution queue in which the process selected by the process selection section 26 is queued. Then, when processing starts, first in step S21 it is judged whether or not the cumulative CPU time used by that process, that is to say the value stored in location 31 in FIG. 9, exceeds a certain threshold value. If it does not exceed the threshold, then, in step S22, that process is classified as a interactive type process; that process is earmarked for queuing in the execution queue used by the interactive type process priority control section 25 in step S23, and the processing ends. The execution queue is located in memory.

In contrast, if in step S21 it is judged that the cumulative CPU time exceeds the threshold, then, in step S24, that process is classified as a non-interactive type process; that process is earmarked for queuing in the execution queue used by the non-interactive type process priority control section 24 in step S25, and the processing ends.

Figure 1:
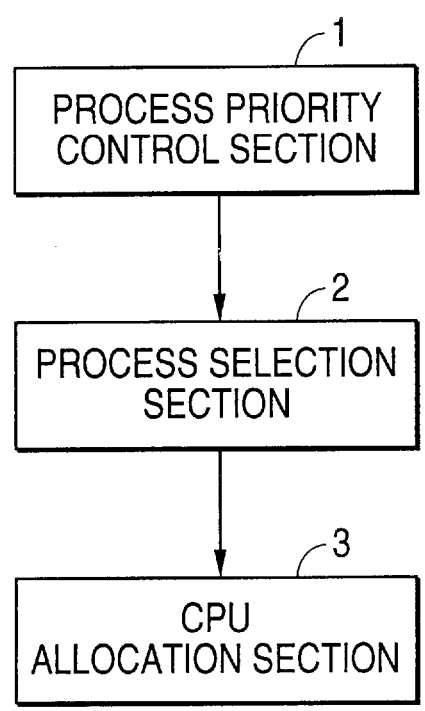
FIG. 1 shows a block diagram of the configuration of a prior a process priority control system.
Figure 2:
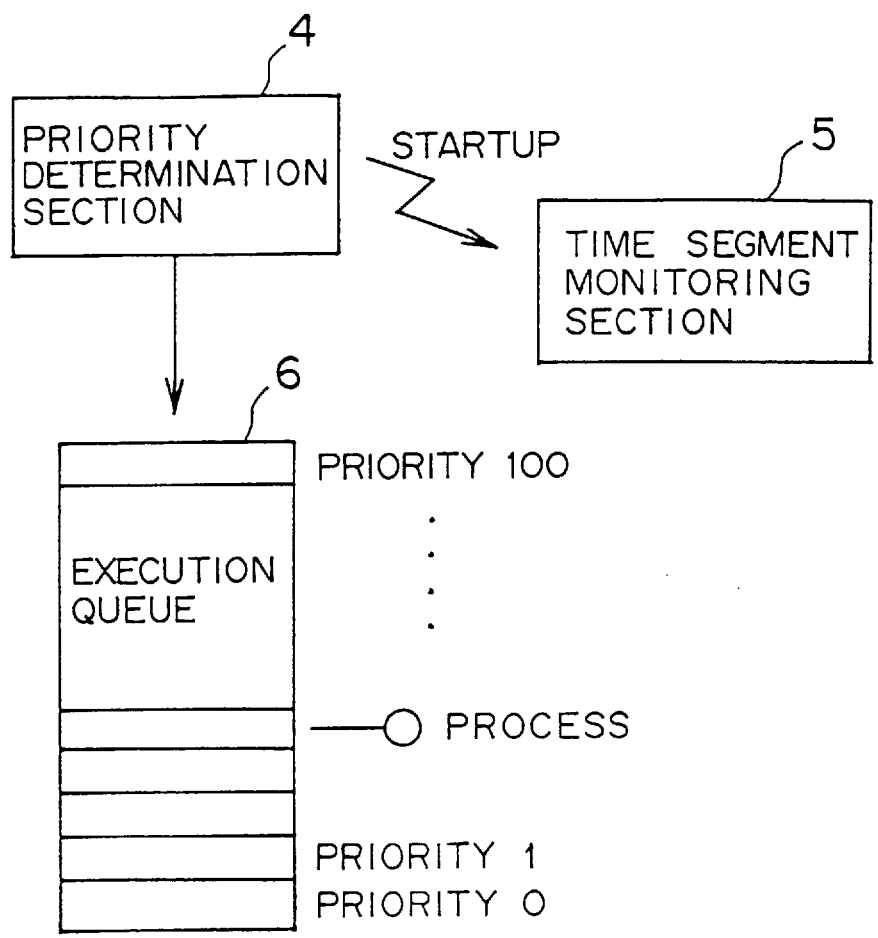
FIG. 2 shows a block diagram of the detailed configuration of the process priority control section in FIG. 1.
Figure 13:
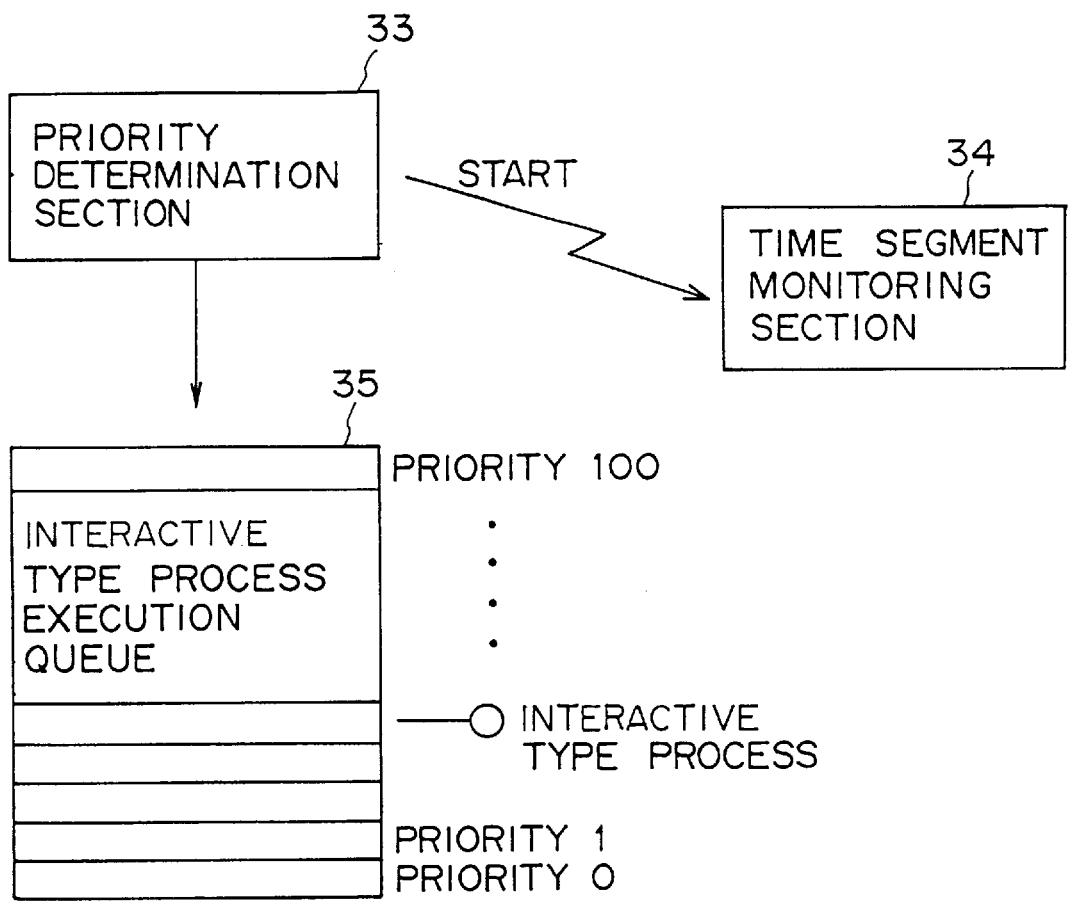
FIG. 13 shows a block diagram of the configuration of the interactive type process priority control section of the present invention.

FIG. 13 is a block diagram showing the configuration of the interactive type process priority control section 25. In this figure, the interactive type process priority control section 25, like the previously existing type of process priority control section 1 in FIG. 1, consists of a priority determination section 33, a time segment monitoring section 34 and a interactive type process execution queue 35.

Figure 14:
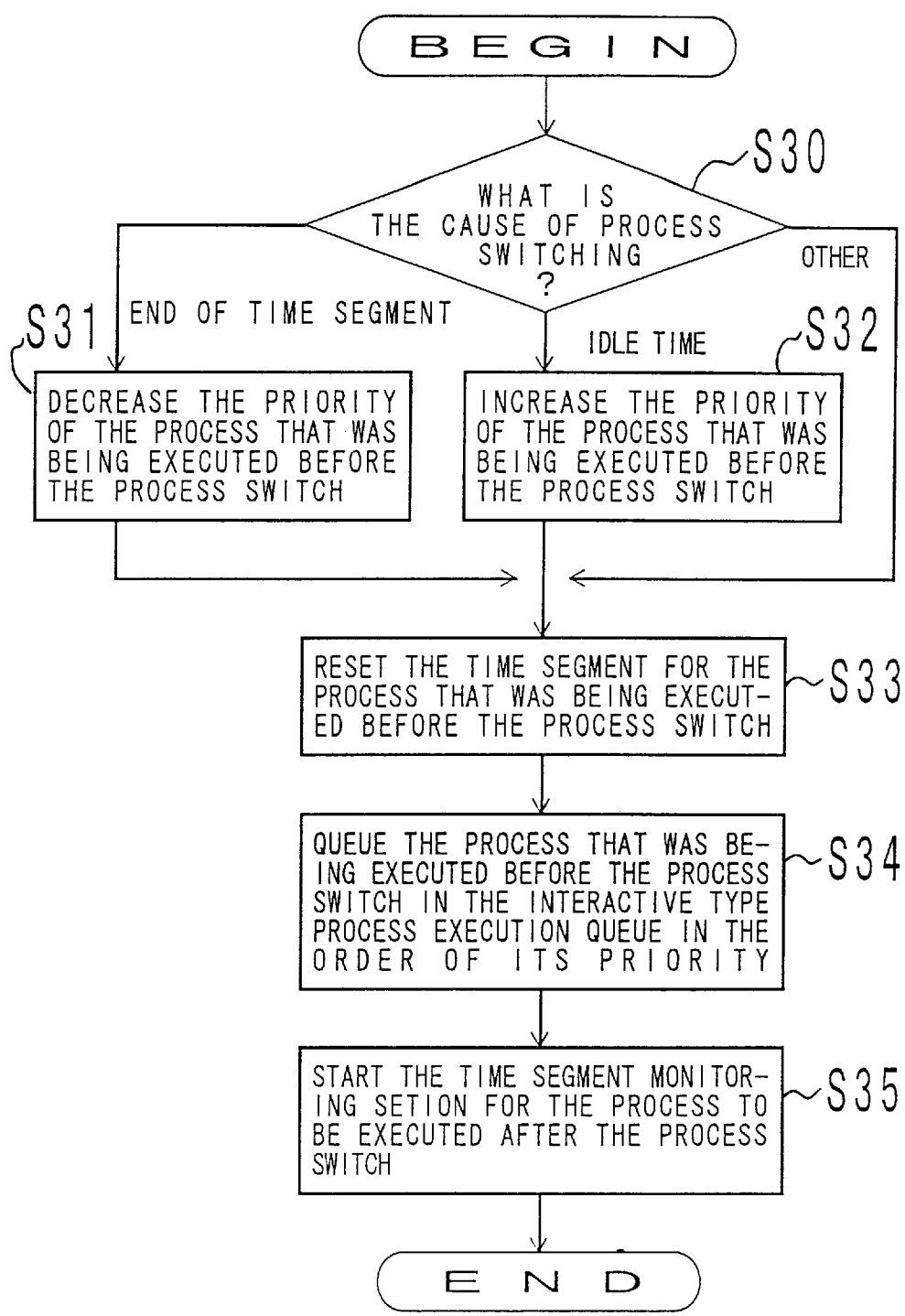
FIG. 14 designates a processing flow chart of the priority determination section for a interactive type process of the present invention.

FIG. 14 is a flow chart of the priority determination processing carried out by the priority determination section 33 within the interactive type process priority control section 25. The processing flow chart in this figure is nearly the same as the flow chart of the previously existing type of process scheduling in FIG. 3, but differs in that the execution queue used in step S5 in FIG. 3 is replaced by the interactive type process execution queue used in step S34 in FIG. 14.

Figure 15:
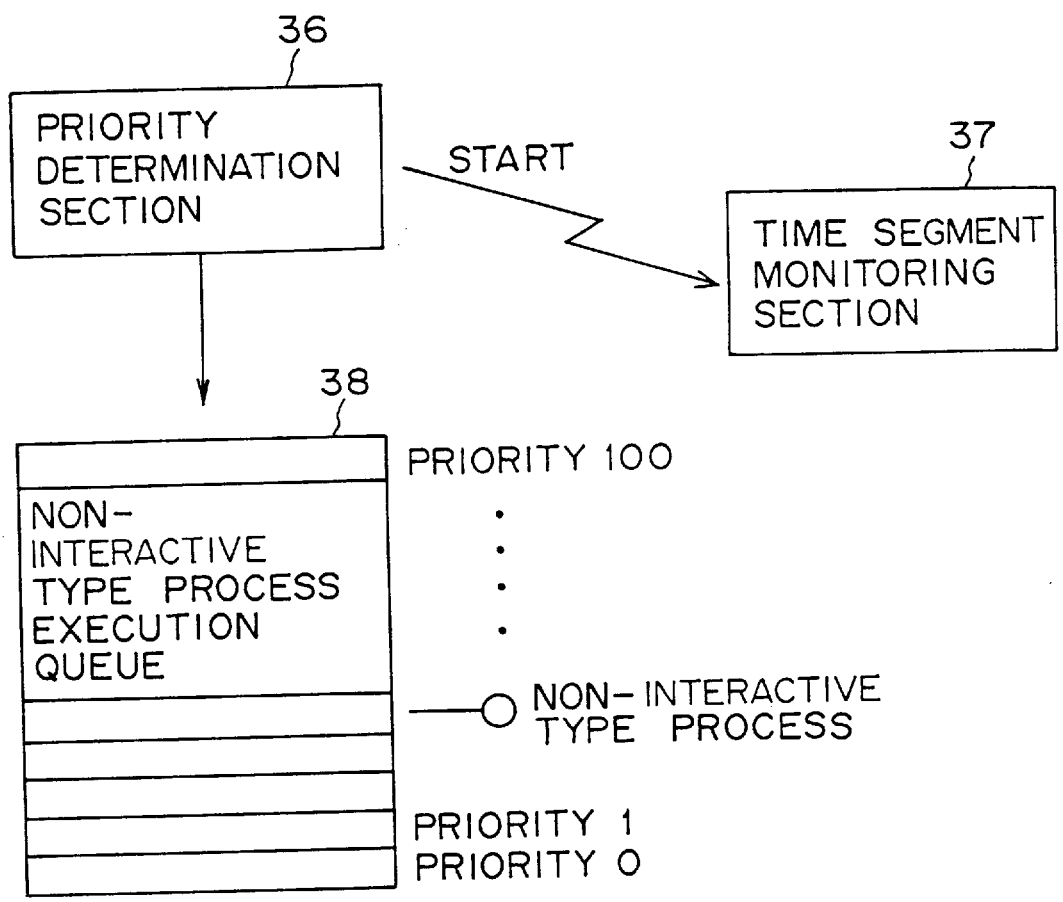
FIG. 15 shows a diagram of the configuration of a non-interactive type process priority control section of the present invention.

FIG. 15 is a block diagram showing the configuration of the non-interactive type process priority control section 24. In this figure, the non-interactive type process priority control section 24, like the interactive type process priority control section in FIG. 13, consists of a priority determination section 36, a time segment monitoring section 37 and a non-interactive type process execution queue 38.

FIG. 16 is a flow chart of priority control processing by the priority determination section 36 for a non-interactive process. Comparing this figure to the flow chart of processing in the interactive type process priority determination section in FIG. 14, the only difference is that the interactive type process execution queue used in S34 is replaced by the non-interactive type process execution queue used in step S44.

Figure 17:
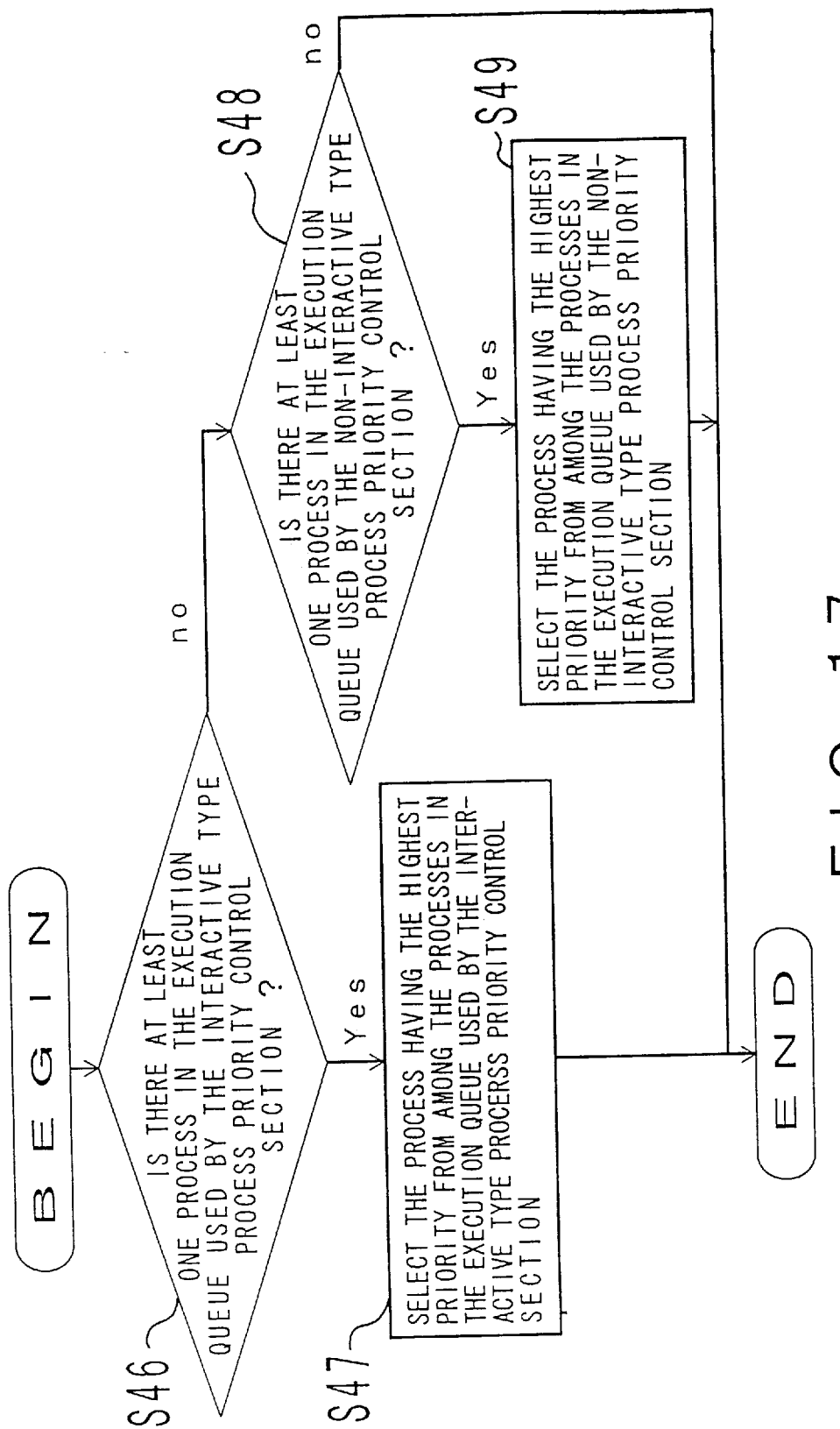
FIG. 17 designates a processing flow chart of the process selection section of the present invention.

FIG. 17 is a flow chart of the processing in the process selection section 26. In this figure, when processing starts in step S46 it is judged whether or not a process exists in the execution queue 35 used by the interactive type process priority control section 25; if at least one does exist, then, in step S47, among the processes queued in that execution queue, the process having the highest priority is selected, and the processing ends.

In contrast, if in step S46 it is judged that there are no processes existing in the execution queue used by the interactive type process priority control section 25, then, in step S48, it is judged whether or not at least one process exists in the execution queue 38 used by the non-interactive type process priority control section 24. If it is judged that at least one does exist, then, in step S49, among the processes queued in that execution queue 38, the process having the highest priority is selected, and the processing ends. If, in step S48, it is judged that a process does not exist in the execution queue, then the processing ends without other action being taken.

Figure 18:
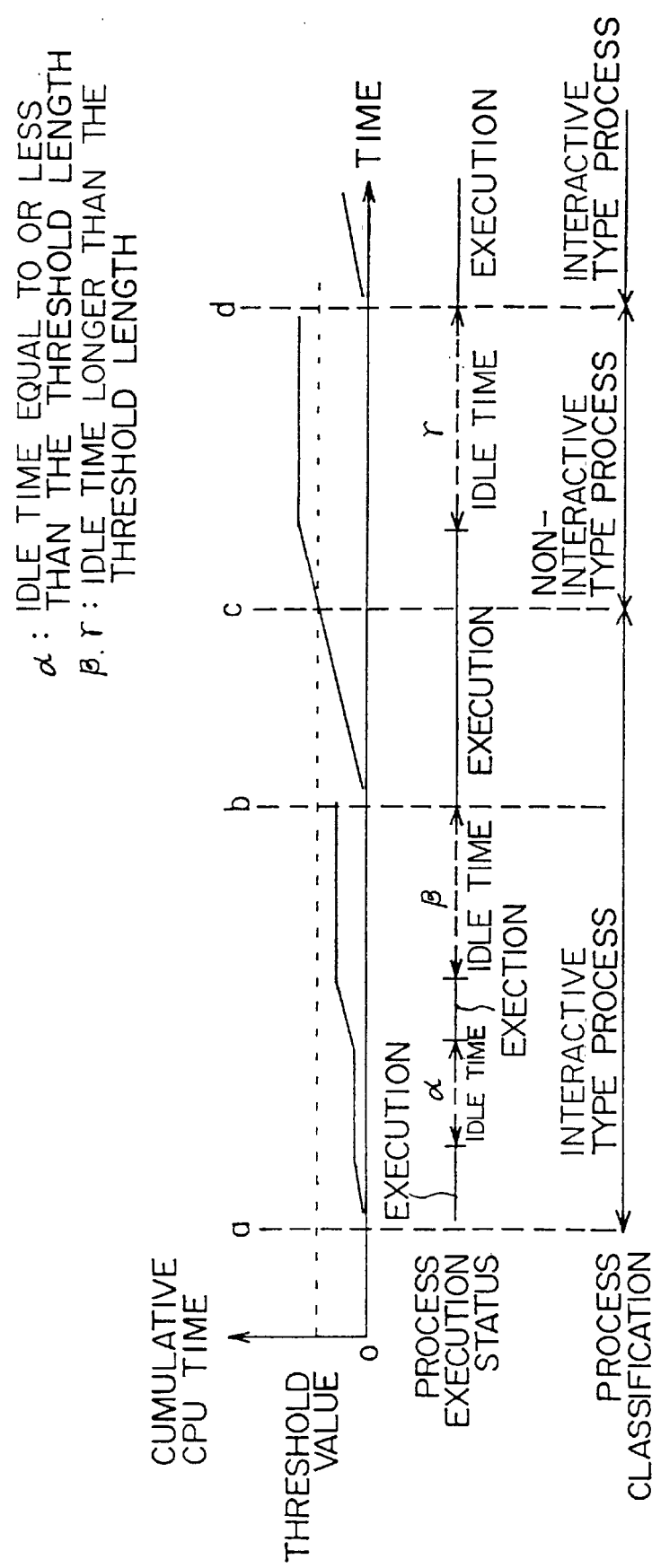
FIG. 18 shows a diagram of an example of process type transition for one process of the present invention.

FIG. 18 shows examples of the change with time of the cumulative CPU time used by one process and the change in classification of that process, a, b, c and d are specific instants of time; (alpha), (beta) and (gamma) are periods of idle time of that process. In this figure the time spent waiting for process execution is not shown.

The cumulative CPU time used by a process that starts execution at time a, starts from 0 and gradually increases. Every time a process switch occurs, the process action status monitoring section 21 computes the new value and stores it in place of the old value in the CPU time storage area 31 of the process action status table 22.

Then the process goes into the idling period (alpha). Since that idle time is at or below the threshold value, the cumulative CPU time is not reset to 0.

When the process quits the next idle time, (beta), at time b, the idle time exceeds the threshold value, so the cumulative CPU time is cleared to 0 by the process action status monitoring section 21.

For this reason, the cumulative CPU time starts to increase from 0 again at time b; it crosses a threshold value at time c, continues to increase and then the process goes into the idle period (gamma). When the process gets out from idling at time d, since that idle time exceeds the threshold value, the cumulative CPU time is cleared to 0 again.

The threshold value that is crossed at the said time c corresponds to the threshold value for judgement in step S21 by the process type determination section in FIG. 12. For this reason, this process is classified as a interactive type process from a to c, as a non-interactive type process from c to d, and again as a interactive type process after d. As stated above, this classification is made every time the process is queued in conjunction with a process switch; the timing of this classification is not shown in FIG. 18.

Figure 19:
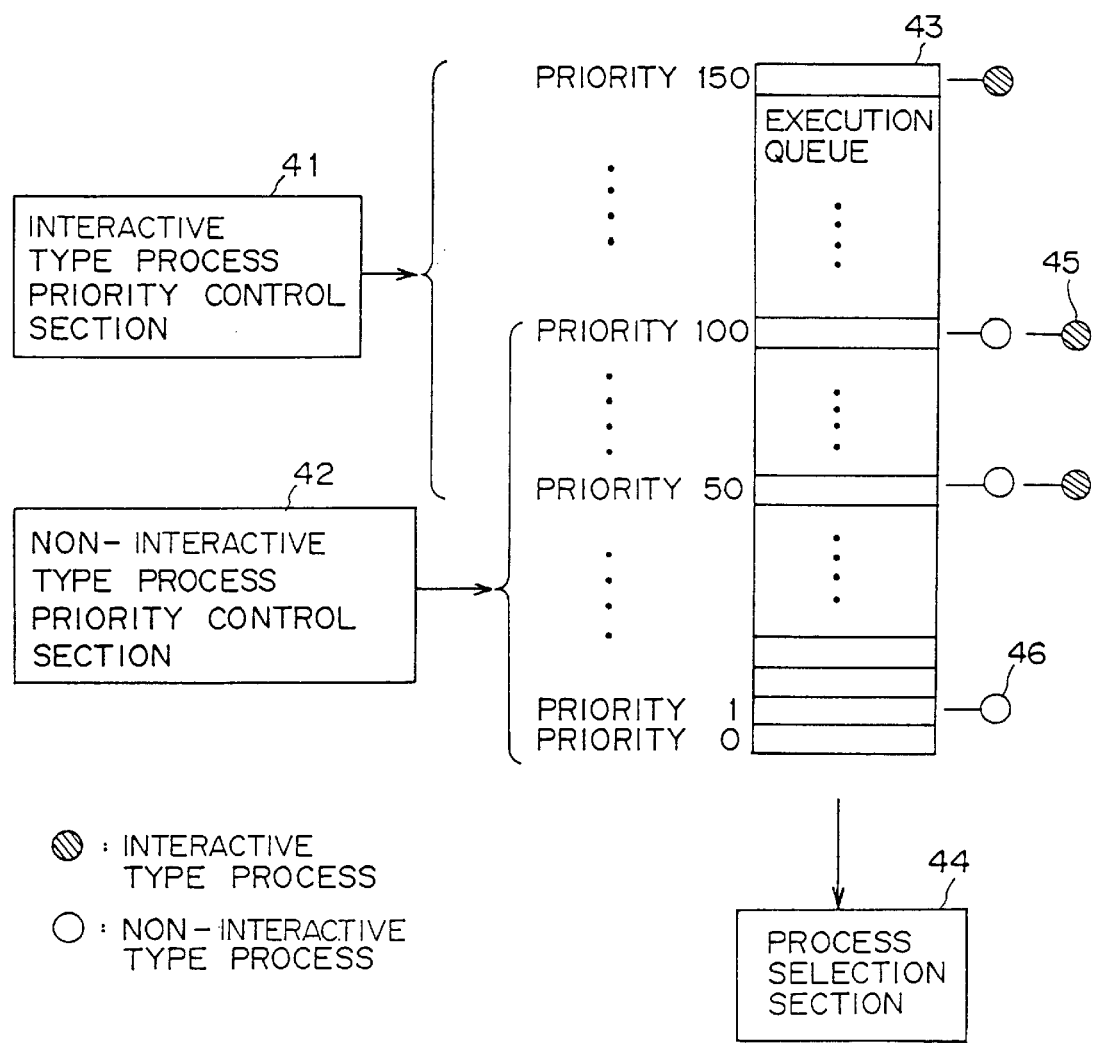
FIG. 19 shows a diagram explaining an embodiment in the case 1 execution queue of the present invention.

The above detailed explanation applies to one embodiment of this invention with the scheduling system shown in FIG. 7. Next, another embodiment that is different from the above embodiment will be explained. FIG. 19 shows an embodiment which uses only one execution queue, rather than 2 different execution queues for interactive type processes and non-interactive type processes. In this figure, the interactive type process execution queue 35 which is formed in the interactive type process priority control section 25 in FIG. 7, and shown in FIG. 13 and the non-interactive type process execution queue 38 which is formed in the non-interactive type process priority control section 24 in FIG. 7, and shown in FIG. 15 are separated from the respective control sections 41 and 42, and are formed as a single execution queue 43 outside of the control sections 41 and 42. In this embodiment, the interactive type process priority control section 41 and the non-interactive type process priority control section 42 determine the interactive type process priority and the non-interactive type process priority, respectively; the processes are queued in order of priority within different limits in the execution queue 43.

A process 45, the priority of which is determined by the interactive type process priority control section 41, is queued in a high priority position within the execution queue 43, for example within the limits of priority 50 to 150; a process 46, the priority of which is determined by the non-interactive type process priority control section 42, is queued in a lower priority range in the execution queue 43, for example between the limits of priority 0 to 100. Since the process selection section 44 selects the highest priority process from the execution queue 43, in general interactive type processes have higher priority than non-interactive type processes.

Figure 20:
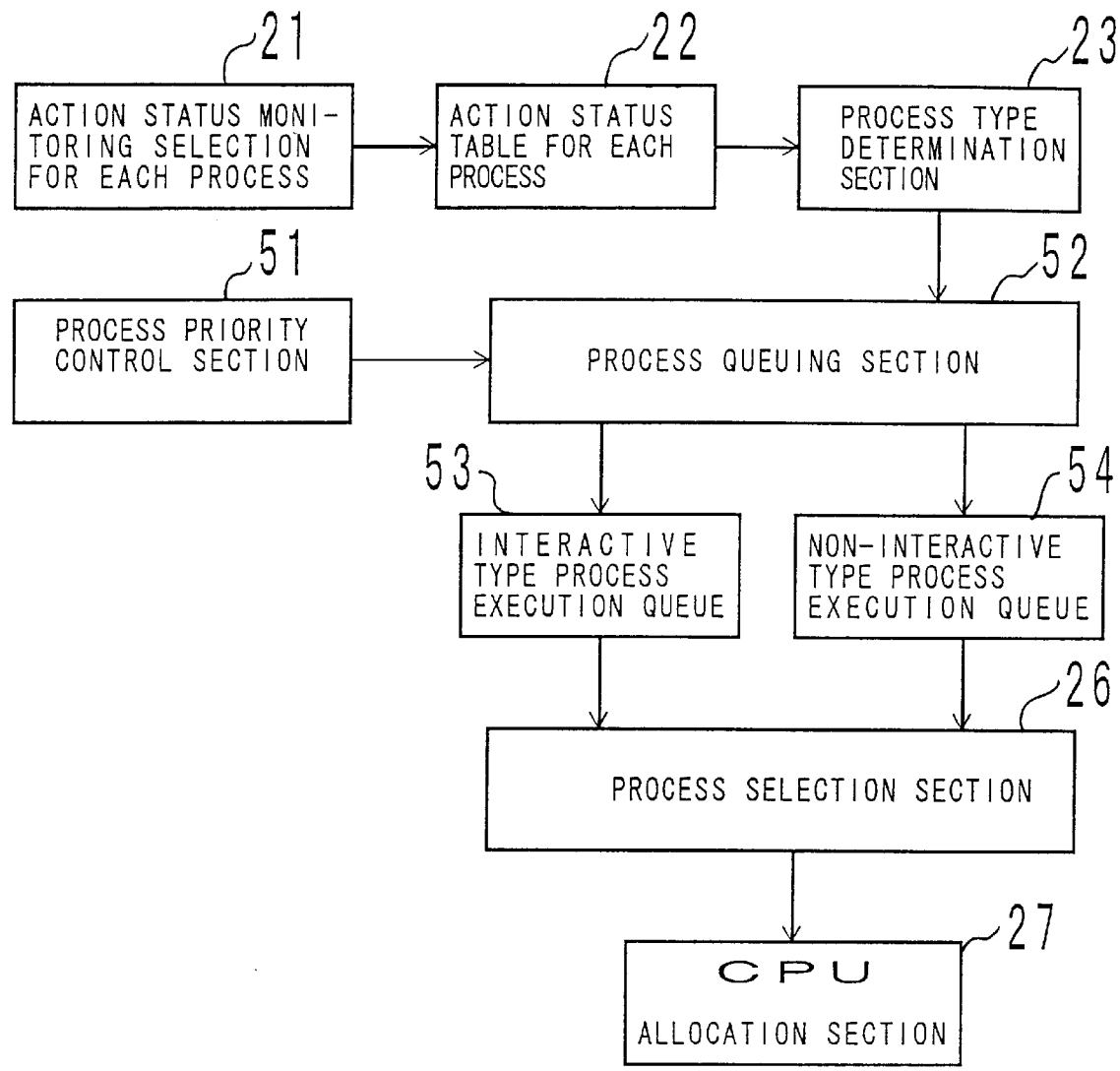
FIG. 20 shows a block diagram of the configuration of an embodiment of a different process scheduling system to the one shown in FIG. 4 of the present invention.

FIG. 20 is a block diagram of the configuration of the process scheduling system of still a further embodiment. In this figure, the actions of the process action status monitoring section 21, the process action status table 22, the process type judgement section 23, the process selection section 26 and the CPU allocation section 27, are the same as in FIG. 7, but the actions of the process priority control section 51, the process queuing section 52, the interactive type process execution queue 53 and the non-interactive type process execution queue 54 are different from the actions of the corresponding sections in FIG. 7.

Figure 21:
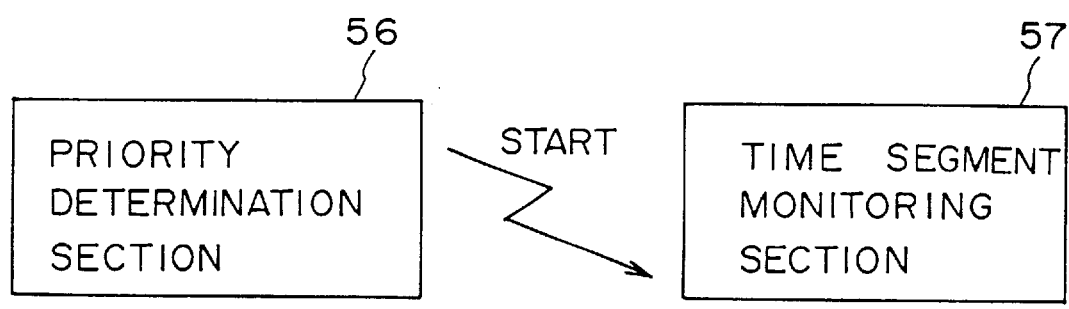
FIG. 21 shows a block diagram of the configuration of the process priority control section 51 in FIG. 20 of the present invention.

In FIG. 20 the process priority control section 51 controls priority independently from the process type judgement made by the process type judgement section 23. FIG. 21 is a block diagram of its configuration; the process priority control section 51 consists of the priority determination section 56 and the time segment monitoring section 57.

Figure 22:
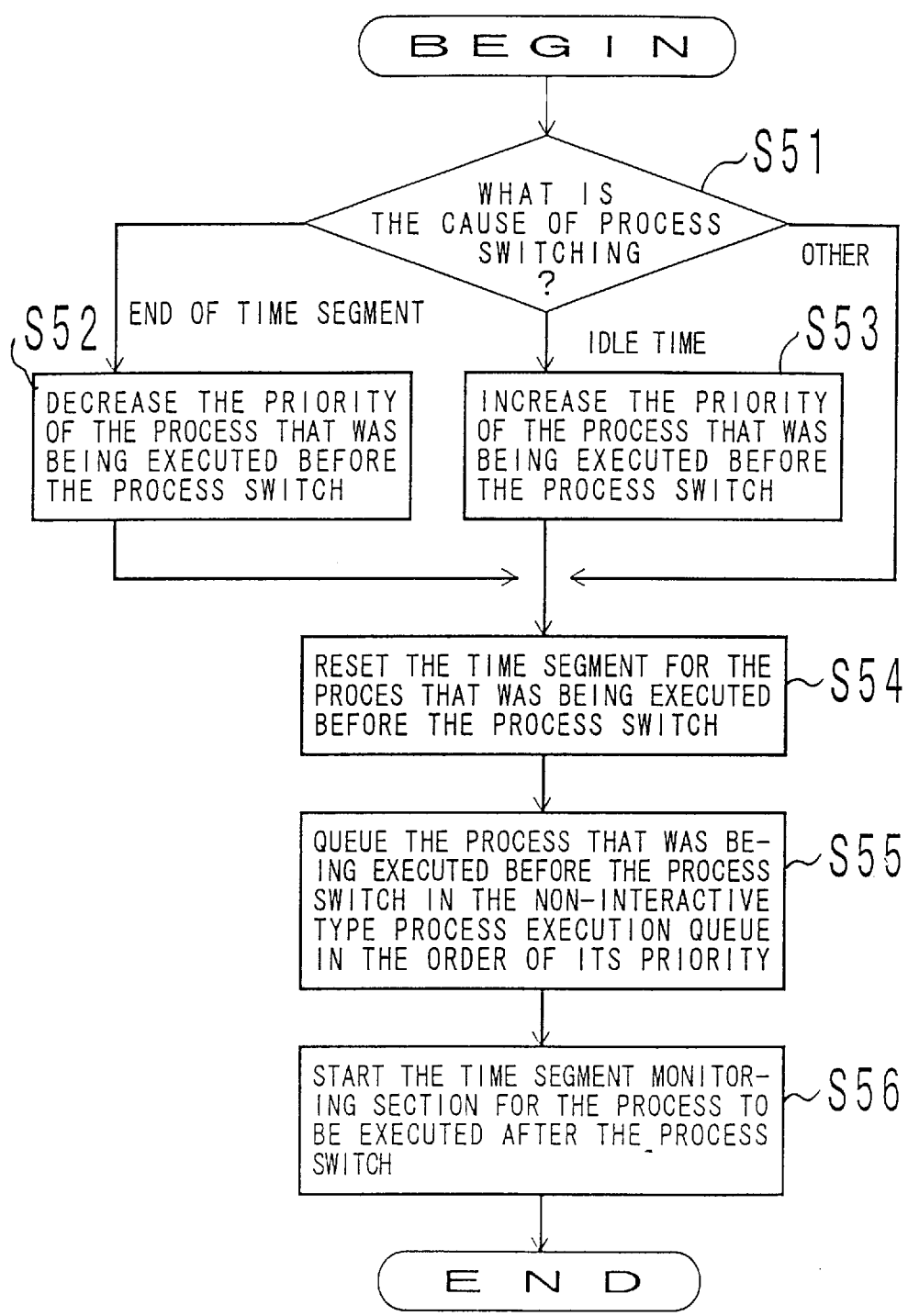
FIG. 22 designates a processing flow chart of the process priority determination section 56 in FIG. 21 of the present invention.

FIG. 22 is a flow chart of the processing in the priority determination section 56 in FIG. 21. Comparing this figure with the example of processing in a previously existing process scheduling system shown in FIG. 3, the only point that is different is that the process queuing section for the process that is executed starts operating before the process switching in step S55.

Figure 23:
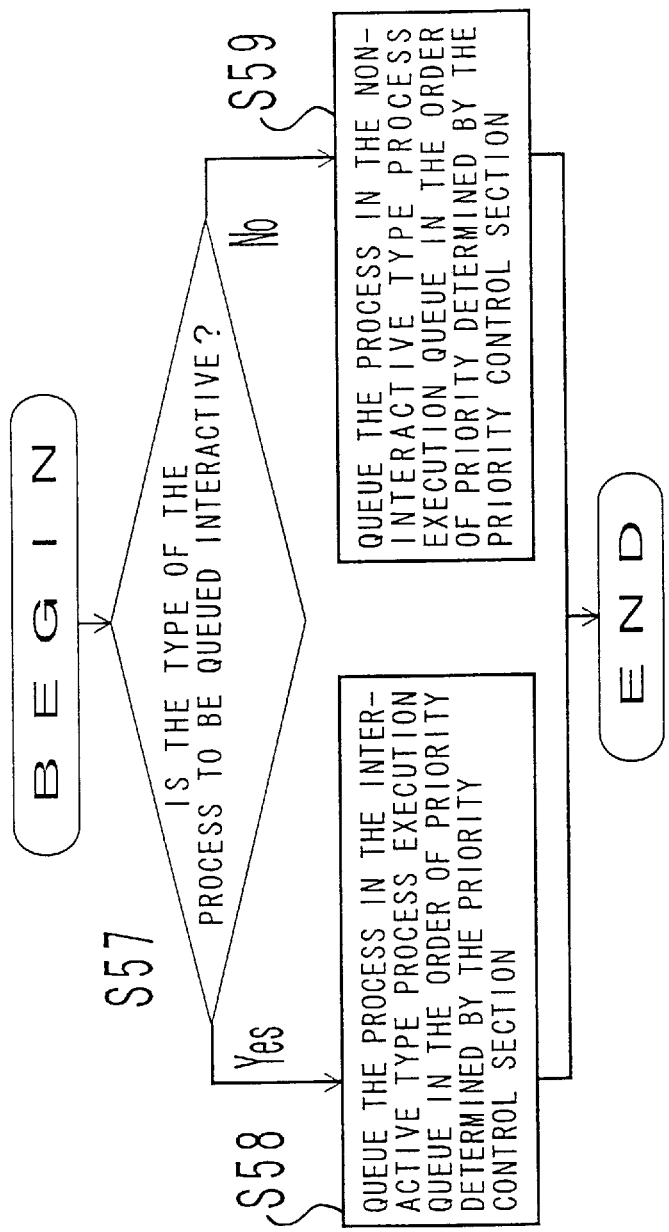
FIG. 23 A represents a processing flow chart of the process queuing section in FIG. 17 of the present invention.

FIG. 23 is a flow chart of the processing in the process queuing section 52 in FIG. 20. As explained above, in the embodiment shown in FIG. 20 the judgement of the process type by the process type judgement section 23 is done independently of the priority control; switching in the execution queue according to the process type judgement result is done in general on the queuing processing timing, which occurs irregularly. In FIG. 23, in step S57 it is judged whether the process to be queued is of the interactive type or not. If it is of the interactive type, then, in step S58, the process is queued in the interactive type process execution queue 53 according to the priority determined by the process priority control section 51, and then the processing ends. If the process is of the non-interactive type, then, in step S59, the process is queued in the non-interactive type process execution queue 54 in accordance with priority, and the processing ends.

As explained in detail above, according to this invention, processes are classified as interactive type processes or non-interactive type processes, and CPU time is preferentially allocated to interactive type processes, permitting faster response for interactive type processes and contributing to a more efficient use of computer systems.

What is claimed is:
1. A computer system for processing a plurality of processes on a time-sharing basis, comprising:

means for monitoring an action status of each of said plurality of processes;

means for determining a process type by classifying each of said plurality of processes as either interactive type or non-interactive type, based on the results of monitoring by said means for monitoring the action status of each process;

means for storing the action status of each process in which the results of the monitoring of the action status of each process by said means for monitoring the action status of each process are stored; and wherein, when said means for monitoring the action status of each process starts operation at a time of process switching, the CPU time used by the process that was being executed before said switching since the last process switching is computed, and a result of said computation is added to a value stored in a cumulative CPU time storage location, corresponding to said process within said means for storing the action status of each process, and the result of the addition is stored in said location as a new cumulative CPU time value.

2. A computer system for processing a plurality of processes on a time-sharing basis, comprising:

means for monitoring an action status of each of said plurality of processes;

means for determining a process type by classifying each of said plurality of processes as one of an interactive type and a non-interactive type, based on the results of monitoring by said means for monitoring the action status of each process;

means for storing the action status of each process in which the results of the monitoring of the action status of each process by said means for monitoring the action status of each process are stored; and wherein, when the process to which the CPU has been allocated starts a period of idle time, said means for monitoring the action status of each process stores said sleep start time in the idling start time storage location corresponding to said process within said means for storing the process action status.

3. A process scheduling system as described in claim 2 wherein, when the period of idle time of a process ends, said means for monitoring the process action status starts up, finds the difference between said idling end time and the idling start time stored in the idling start time storage location corresponding to said process within said means for monitoring the process action status, and clears a value of the cumulative CPU time storage location corresponding to said process in said means for monitoring the action status of each process to zero when said difference exceeds a predetermined value.

4. A computer system for processing a plurality of processes on a time-sharing basis, comprising:

means for monitoring an action status of each of said plurality of processes;

means for determining a process type by classifying each of said plurality of processes as one of an interactive type and a non-interactive type, based on the results of monitoring by said means for monitoring the action status of each process;

means for storing the action status of each process in which the results of the monitoring of the action status of each process by said means for monitoring the action status of each process are stored: and wherein, said means for determining the process type compares the cumulative CPU time used by each process stored in said means for storing the process action status and a predetermined threshold value and, classifies a process as the interactive type when the corresponding CPU time is smaller than the threshold value, and as the non-interactive type in the opposite case.

5. A computer system for processing a plurality of processes on a time-sharing basis, comprising:

means for monitoring an action status of each of said plurality of processes;

means for determining a process type by classifying each of said plurality of processes as one of an interactive type and a non-interactive type, based on the results of monitoring by said means for monitoring the action status of each process;

means for controlling the priority of non-interactive type processes, with which the CPU is allocated to said non-interactive type processes; and means for controlling the priority of interactive type processes, with which the CPU is allocated to said interactive type processes.

6. A process scheduling system as described in claim 7, further comprising:

an interactive type process queue in which the interactive type processes, the priorities of which are controlled by said means for controlling the priority of interactive type processes, are queued in order of said priorities, and a non-interactive type process queue in which the non-interactive type processes the priorities of which are controlled by said means for controlling the priority of non-interactive type processes, are queued in order of said priorities.

7. A process scheduling system as described in claim 6 further comprising:

means for selecting the process having the highest priority from among said processes that are queued in said interactive type process execution queue at the time of queuing, and for selecting the process having the highest priority from among said processes that are queued in said non-interactive type process execution queue at the time of queuing; and means for allocating the CPU to said selected process.

8. A process scheduling system as described in claim 5 further comprising an execution queue containing both the interactive type processes of which the priorities are controlled by said means for controlling the priority of interactive type processes, and the non-interactive type processes of which the priorities are controlled by said means for controlling the priority of non-interactive type processes, and in which said interactive type processes are queued within a higher priority range than said non-interactive type processes.

9. A process scheduling system as described in claim 8 further comprising:

means for selecting a process having the highest priority from among the interactive type processes and the non-interactive type processes queued in said execution queue; and means for allocating the CPU to said selected process.

10. A computer system for processing a plurality of processes on a time-sharing basis comprising:

means for monitoring an action status of each of said plurality of processes;

means for determining a process type by classifying each of said plurality of processes as either interactive type or non-interactive type, based on the results of monitoring by said means for monitoring the action status of each process;

means for controlling the priority of processes independently of the determination of process type by said means for determining the process type;

means of process queuing for storing interactive type processes in the interactive type process execution queue and storing non-interactive type processes in the non-interactive type process execution queue, based on the results of priority control by said means of process priority control and the determination of the process type by said means for determining the process type;

means for selecting the process of highest priority from among the processes stored in said interactive type process execution queue when such interactive type processes are stored in the queue, and selects the process of highest priority from among the processes stored in said non-interactive type process execution queue when there are no interactive type processes queued in the interactive type process execution queue; and means for allocating the CPU to said selected process.

11. A process scheduling method for use in a computer system that processes a plurality of processes on a time-sharing basis, comprising the steps of:

computing, at the time of process switching, the CPU time used by the process that was being executed before said switch, since the last process switch;

adding the result of said computation to the value read out from the cumulative CPU time storage location corresponding to said process within a means of storage of the process action status, and storing the result of the addition in said location in place of an old value;

when the process starts a period of idle time, storing said idling start time in the idling start time storage location corresponding to said process in said means for storing process action status;

when a period of idle time of a process ends, finding the difference between said idling end time and the idling start time stored in the idling start time storage location corresponding to said process in said means for storing the process action status;

when said difference exceeds a certain threshold value, clearing the value in the cumulative CPU time storage location corresponding to said process within said means for storing process action status to zero;

comparing the value stored in the cumulative CPU time storage location within said means for storing process action status with a predetermined threshold value;

classifying the process to which said cumulative CPU time storage location corresponds as an interactive type process when the value stored in the cumulative CPU time storage location is similar, as a non-interactive type process when the opposite is true; and preferentially allocation of the CPU of said computer system to a process classified as an interactive type process.

12. A process scheduling method as described in claim 11 wherein:

said preferentially allocation of the CPU step further comprising the steps of:

assigning CPU allocation priorities to said non-interactive type processes;

assigning CPU allocation priorities to said interactive type processes;

queuing said interactive type processes in an interactive type process execution queue in order of said priorities;

queuing said non-interactive type processes in an interactive type process execution queue in order of said priorities;

when processes are queued in said interactive type process execution queue, selecting the process having the highest priority from among said queued processes;

when no processes are queued in said interactive type process execution queue, selecting the process having the highest priority from among the processed queued in said non-interactive type process execution queue; and allocating the CPU to said selected process.

13. A process scheduling method as described in claim 11 wherein:

said preferentially allocation of the CPU step further comprising the steps of:

assigning CPU allocation priorities to said non-interactive type processes;

assigning CPU allocation priorities to said interactive type processes that are a higher range of priorities than those assigned to said non-interactive processes;

queuing said interactive type processes in said execution queue in order of said priorities;

queuing said non-interactive type processes in an execution queue in order of said priorities;

when at least one process is queued in said execution queue, selecting the process having the highest priority from among the processed said queued processes; and allocating the CPU to said selected process.

14. A method for processing a plurality of processes on a time-sharing basis on a computer system, comprising the steps of:

monitoring an action status of each of said plurality of processes;

determining a process type by classifying each of said plurality of processes as one of an interactive type and a non-interactive type, based on the results of monitoring by said means for monitoring the action status of each process;

controlling the priority of said non-interactive type processes, with which the CPU is allocated to said non-interactive type processes; and controlling the priority of interactive type processes, with which the CPU is allocated to said interactive type processes.

* * * * *